(12) United States Patent
Yang et al.

(10) Patent No.: US 11,214,442 B2
(45) Date of Patent: Jan. 4, 2022

(54) AUXILIARY CARRIER, CARRIER ASSEMBLY AND CARRYING APPARATUS

(71) Applicants: Tyco Electronics (Shanghai) Co. Ltd., Shanghai (CN); TE Connectivity Services GmbH, Schaffhausen (CH); Kunshan League Automechanism Co., Ltd., Kunshan (CN)

(72) Inventors: An Yang, Shanghai (CN); Lvhai Hu, Shanghai (CN); Dandan Zhang, Shanghai (CN); Roberto Francisco-Yi Lu, Bellevue, WA (US); Jian Cao, Shanghai (CN); Yun Liu, Shanghai (CN); Yuting He, Kunshan (CN); Haidong Wu, Kunshan (CN); Hui Xiao, Kunshan (CN)

(73) Assignees: Tyco Electronics (Shanghai) Co. Ltd., Shanghai (CN); TE Connectivity Services GmbH, Schaffhausen (CH); Kunshan League Automechanism Co., Ltd., Kunshan (CN)

( * ) Notice: Subject to any disclaimer, the term of this patent is extended or adjusted under 35 U.S.C. 154(b) by 0 days.

(21) Appl. No.: 17/069,270

(22) Filed: Oct. 13, 2020

(65) Prior Publication Data

US 2021/0122575 A1 Apr. 29, 2021

(30) Foreign Application Priority Data

Oct. 25, 2019 (CN) .......................... 201921814916.5

(51) Int. Cl.
*B65G 17/14* (2006.01)
*B65G 17/32* (2006.01)
*H01R 43/00* (2006.01)

(52) U.S. Cl.
CPC .......... *B65G 17/14* (2013.01); *B65G 17/323* (2013.01); *H01R 43/00* (2013.01); *B65G 2201/02* (2013.01)

(58) Field of Classification Search
CPC ...... B65G 17/14; B65G 17/323; B65G 17/16; H01R 43/00
See application file for complete search history.

(56) References Cited

U.S. PATENT DOCUMENTS

| 4,194,281 A | * | 3/1980 | Gudmestad | H01R 43/28 29/867 |
| 5,709,027 A | * | 1/1998 | Kato | H01R 43/01 29/33 M |
| 6,360,436 B1 | * | 3/2002 | Takada | H01R 43/055 198/346.2 |

* cited by examiner

*Primary Examiner* — William R Harp
(74) *Attorney, Agent, or Firm* — Barley Snyder

(57) ABSTRACT

An auxiliary carrier includes a first base, a first supporting base mounted on the first base and having a plurality of receiving grooves receiving a plurality of components of an electrical connector, and a first coupling portion mounted on the first base or the first supporting base. The first coupling portion is adapted to be coupled with a second coupling portion of a main carrier so that the auxiliary carrier is movable along with the main carrier.

20 Claims, 10 Drawing Sheets

US 11,214,442 B2

AUXILIARY CARRIER, CARRIER ASSEMBLY AND CARRYING APPARATUS

CROSS-REFERENCE TO RELATED APPLICATION

This application claims the benefit of the filing date under 35 U.S.C. § 119(a)-(d) of Chinese Patent Application No. 201921814916.5, filed on Oct. 25, 2019.

FIELD OF THE INVENTION

At least one embodiment of the present disclosure relates to an auxiliary carrier and, more particularly, to an auxiliary carrier adapted to carry a cable and components of an electrical connector during an installation of the electrical connector to the cable.

BACKGROUND

Generally, during manufacturing an electrical connector with a cable, the prepared cable, a connection terminal connected to the cable, and a housing mounted on the connection terminal are firstly placed at a predetermined position of a carrier in advance. The carrier is then transported by a transporting device to transport the cable, the connection terminal, and the housing to a predetermined station. Thereafter, the cable, the connection terminal, and the housing are removed by a robot respectively and are assembled into the electrical connector at an installation station.

For different types of electrical connectors, the connection terminals and the housings are different in shape and size. In order to realize an accurate automated assembly process, the connection terminals and the housing must be accurately placed in specific receiving grooves so that the connection terminals or the housing are accurately picked up by the robot. For this reason, different carriers need to be prepared for different types of electrical connectors. Thus, replacing the entire carrier would result in increased production cost.

SUMMARY

An auxiliary carrier includes a first base, a first supporting base mounted on the first base and having a plurality of receiving grooves receiving a plurality of components of an electrical connector, and a first coupling portion mounted on the first base or the first supporting base. The first coupling portion is adapted to be coupled with a second coupling portion of a main carrier so that the auxiliary carrier is movable along with the main carrier.

BRIEF DESCRIPTION OF THE DRAWINGS

The invention will now be described by way of example with reference to the accompanying Figures, of which.

DETAILED DESCRIPTION OF THE EMBODIMENTS

Figure 1:
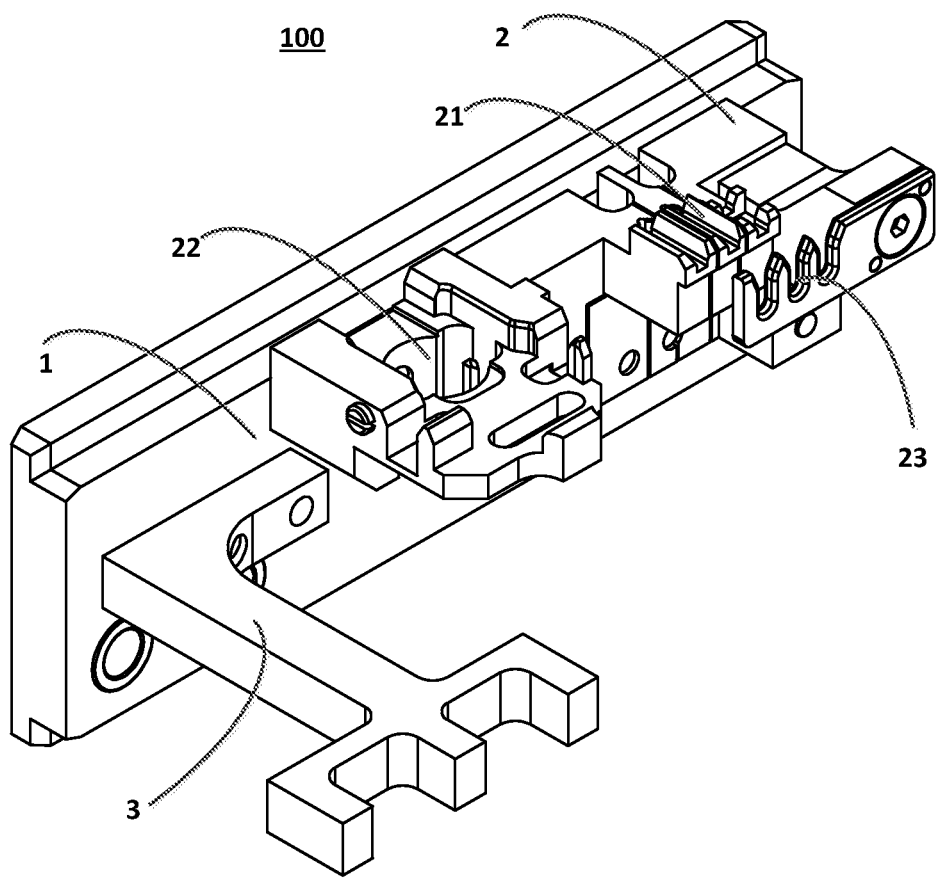
FIG. 1 is a perspective view of an auxiliary carrier according to an embodiment.

The technical solution of the disclosure will be described hereinafter in further detail with reference to the following embodiments, taken in conjunction with the accompanying drawings. In the description, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

An auxiliary carrier 100 according to an embodiment, as shown in FIGS. 1-5, is adapted to carry components of an electrical connector (e.g., a connection terminal 401, a housing and the like) during an installation of the electrical connector to a cable 400. The auxiliary carrier 100 comprises a first base 1 arranged vertically, a first supporting base 2 horizontally mounted on the first base 1, and a first coupling portion 3 mounted on the first base. In an alternative embodiment, the first coupling portion 3 may be mounted on the first supporting base 2. The first supporting base 2 is provided with receiving grooves adapted to receive the components of the electrical connector. The first coupling portion 3 is adapted to be coupled with a second coupling portion 7 of a main carrier 200 (as described in detail later) so that the auxiliary carrier 100 is movable along with the main carrier 200.

The receiving grooves, as shown in FIGS. 1-5, include a terminal receiving groove 21 adapted to receive the connection terminal 401 of the electrical connector and a housing receiving groove 22 adapted to receive the housing of the electrical connector. The receiving grooves also include a plurality of wire receiving grooves 23 adapted to receive a plurality of wires 402 of the cable 400. The wire receiving grooves 23 are arranged in a row at intervals to receive the plurality of wires 402 extending from the cable 400.

The first supporting base 2 is detachably mounted on the first base 1 in an embodiment. In this way, when the connection terminals 401 and/or the housings of different shapes and/or sizes are placed on the auxiliary carrier 100, it is only necessary to replace the first supporting base 2 of corresponding shape and/or size without replacing the entire auxiliary carrier 100, thereby reducing cost of the auxiliary carriers 100.

In an exemplary embodiment, as shown in FIGS. 6-10, a carrier assembly 300 comprises a main carrier 200 and the auxiliary carrier 100 as described in any one of the above embodiments. The main carrier 200 is adapted to be assembled with the auxiliary carrier 100 so that the auxiliary carrier 100 is movable along with the main carrier 200.

The main carrier 200, as shown in FIGS. 6-11, includes a second base 4 arranged substantially vertically, a movable mechanism 5, a second supporting base 6, and a second coupling portion 7. The movable mechanism 5 is mounted on the second base 4 to drive the carrier assembly 300 to be moved. The second supporting base 6 is mounted on the second base 4 and provided with a holding mechanism 61 for holding a cable 400. The second coupling portion 7 is provided on a side of the second supporting base 6 opposite to the movable mechanism 5 and is adapted to be coupled with the first coupling portion 3 of the auxiliary carrier 100 so that the auxiliary carrier 100 is movable along with the main carrier 200.

Figure 11:
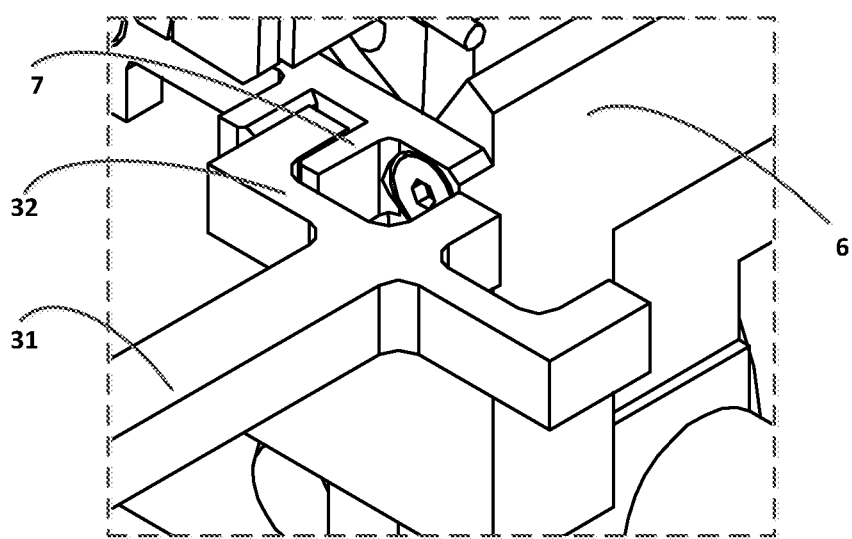
FIG. 11 is a detail view of a part C of FIG. 9.

As shown in FIGS. 1-6 and 11, the first coupling portion 3 comprises a cantilever 31 mounted on the first base 1 and a fork portion 32 provided on the cantilever 31 and protruding from the first base 1. Accordingly, as shown in FIG. 11, the second coupling portion 7 has an engagement groove cooperated with the fork portion 32 of the first coupling portion 3. The fork portion 32 is engaged with the engagement groove of the second coupling portion 7 so that the main carrier 200 can drive the auxiliary carrier 100 to move. It is appreciated that the first coupling portion 3 is not limited to being formed with the fork portion 32. For example, the first coupling portion 3 may be formed with a guide rod adapted to be inserted into the second coupling portion 7, as long as the main carrier 200 can drive the auxiliary carrier 100 to be moved in the case where the first coupling portion 3 is coupled with the second coupling portion 7.

Figure 12:
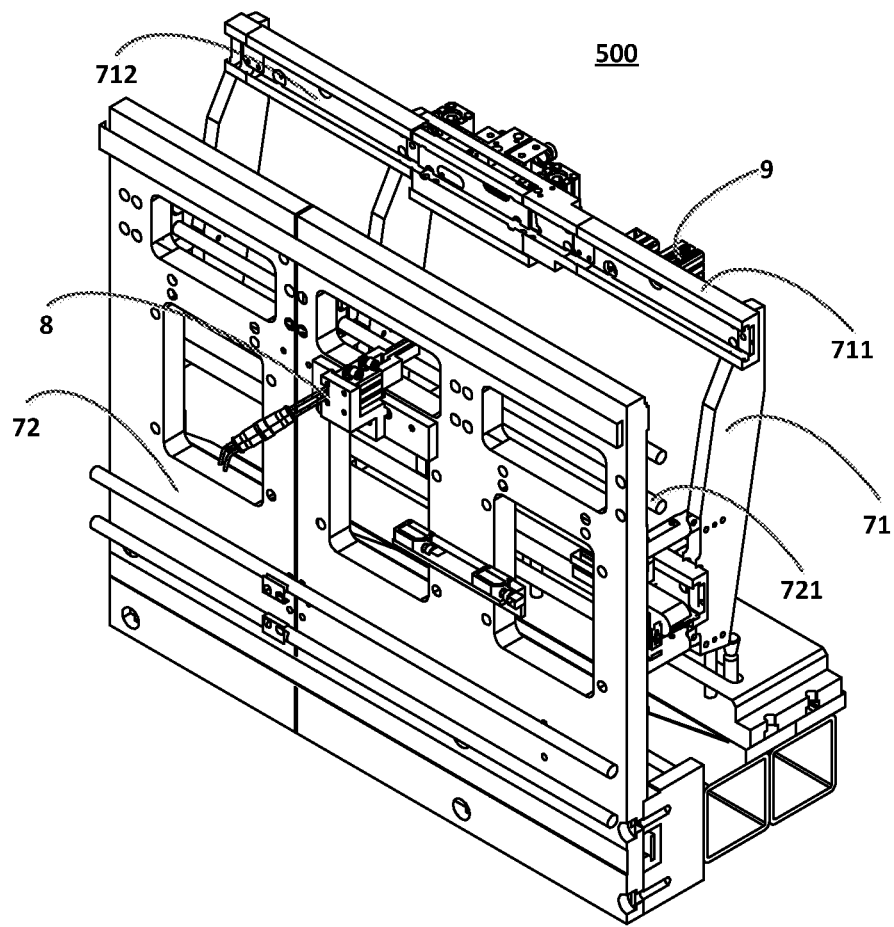
FIG. 12 is a perspective view of a carrying apparatus according to an embodiment.
Figure 13:
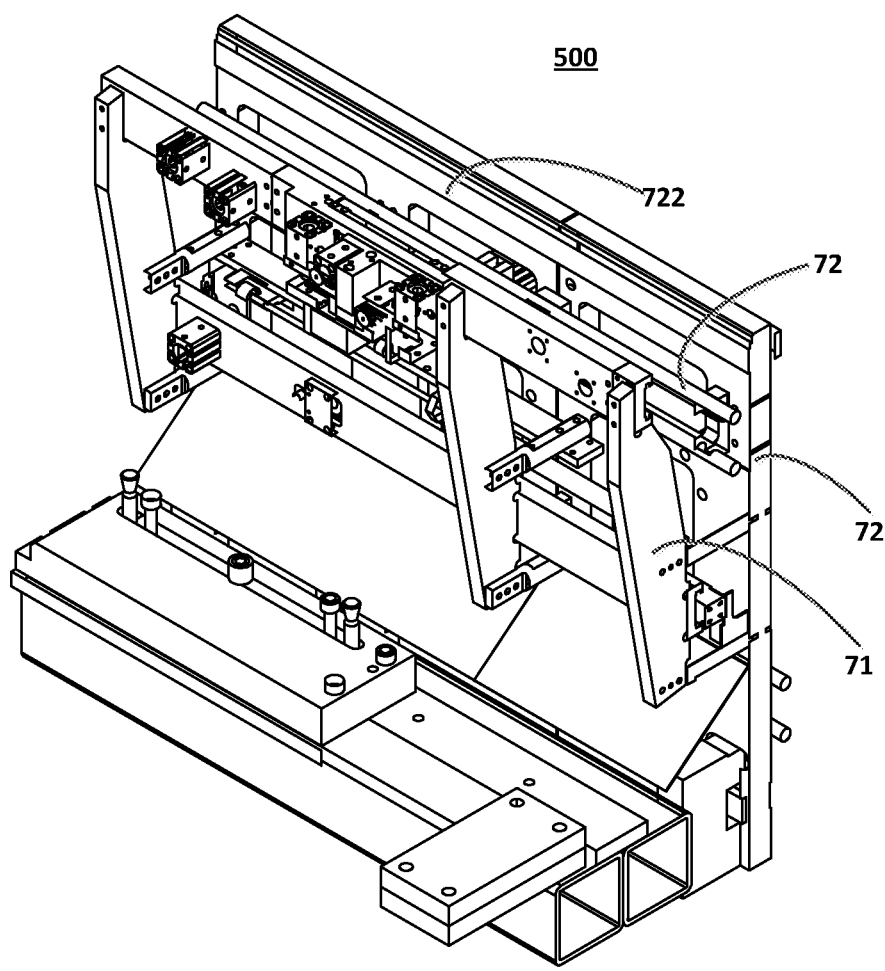
FIG. 13 is another perspective view of the carrying apparatus.

In an exemplary embodiment, as shown in FIGS. 12 and 13, a carrier apparatus 500 comprises the carrier assembly 300 as described in any one of the above embodiments, a first frame 71 and a second frame 72. The first base 1 of the auxiliary carrier 100 is movably mounted on the first frame 71. The second frame 72 is arranged to face towards the first frame 71. The movable mechanism 5 of the main carrier 200 is mounted on the second frame 72 such that the carrier assembly 300 is movable on the first frame 71 and the second frame 72. The auxiliary carrier 100 and the main carrier 200 coupled with each other by the first and second coupling portions 3, 7 are sandwiched between the first and second frames 71, 72.

Figure 2:
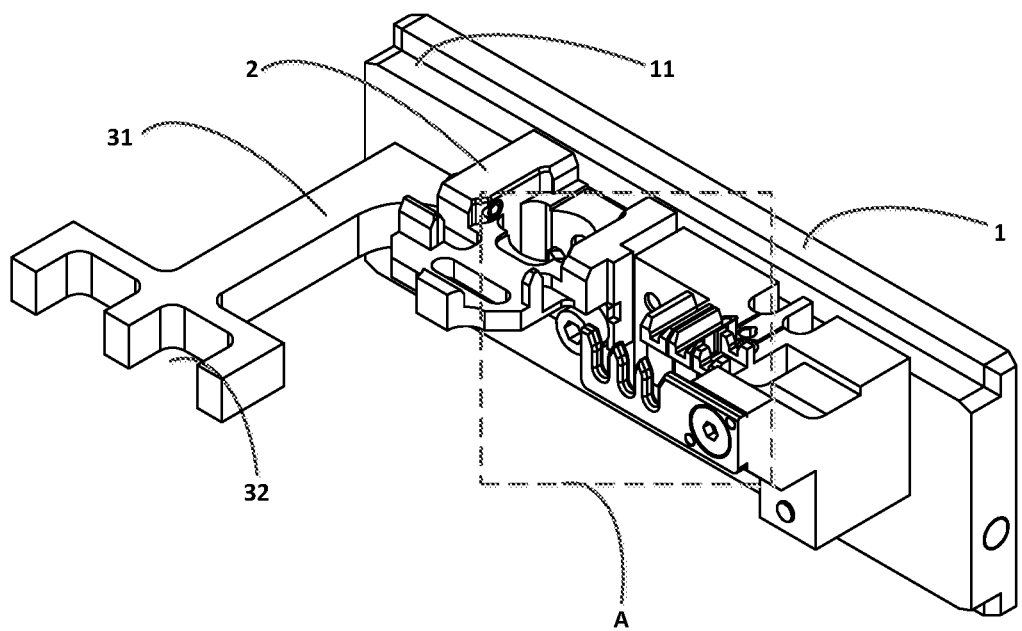
FIG. 2 is another perspective view of the auxiliary carrier.
Figure 3:
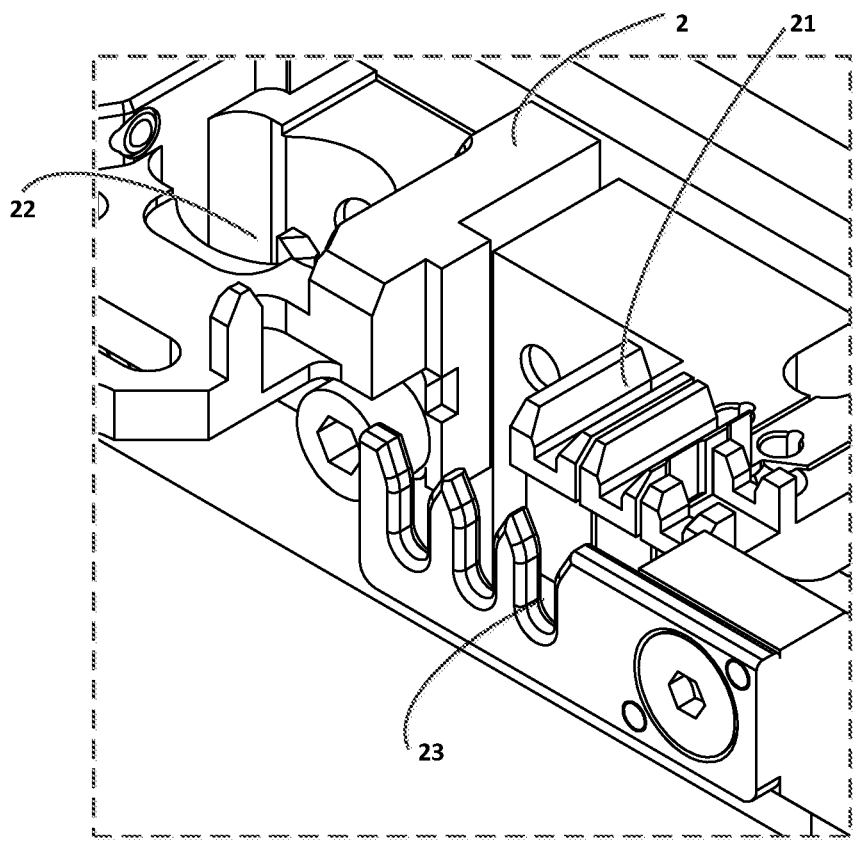
FIG. 3 is a detail view of a part A of FIG. 2.
Figure 4:
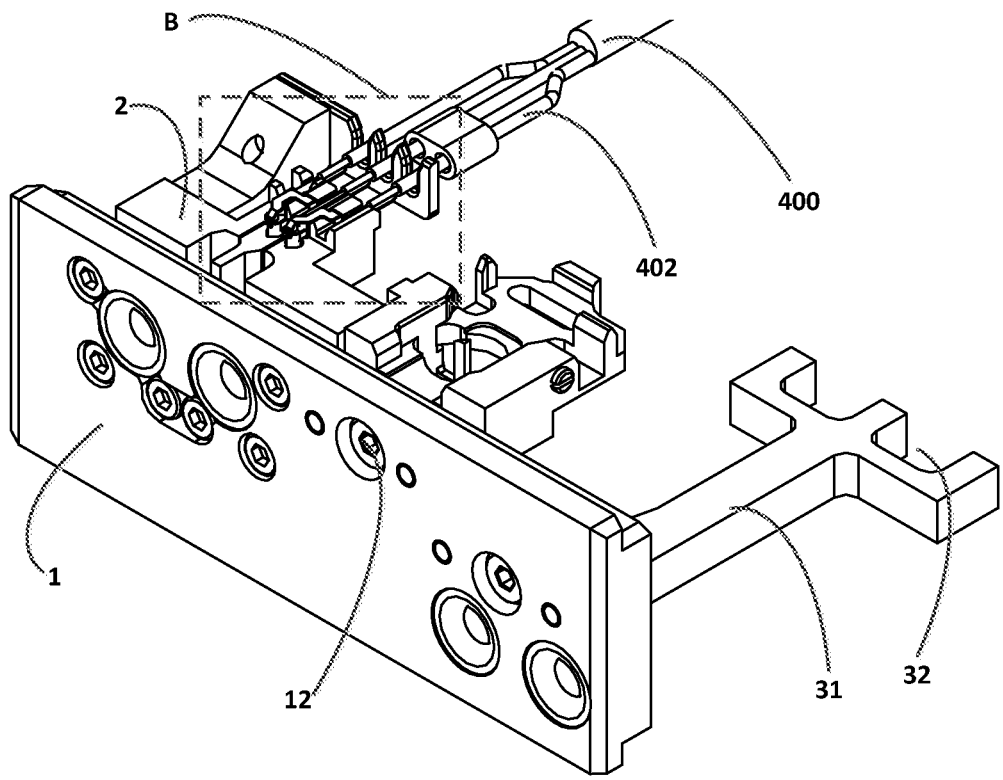
FIG. 4 is a perspective view of the auxiliary carrier with cable and connection terminals on the auxiliary carrier.
Figure 5:
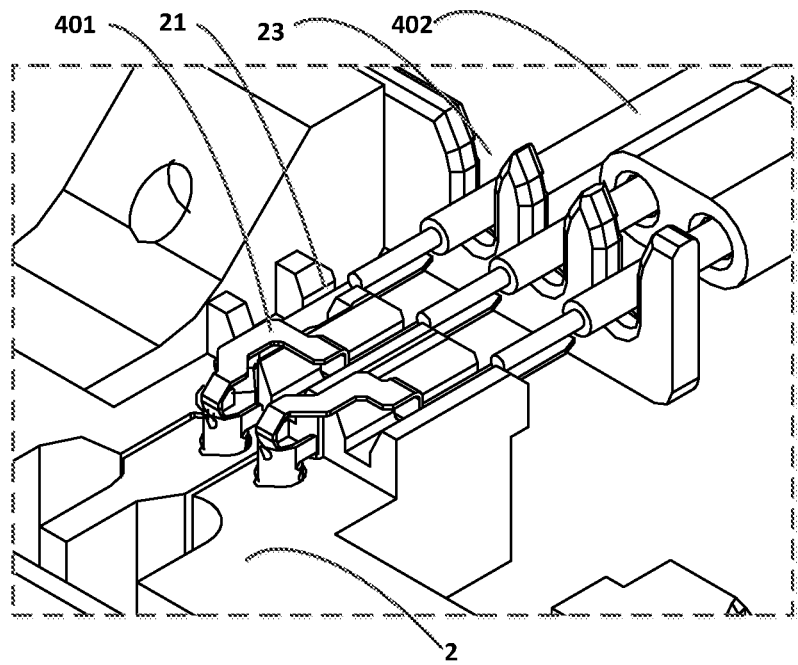
FIG. 5 is a detail view of a part B of FIG. 4.
Figure 6:
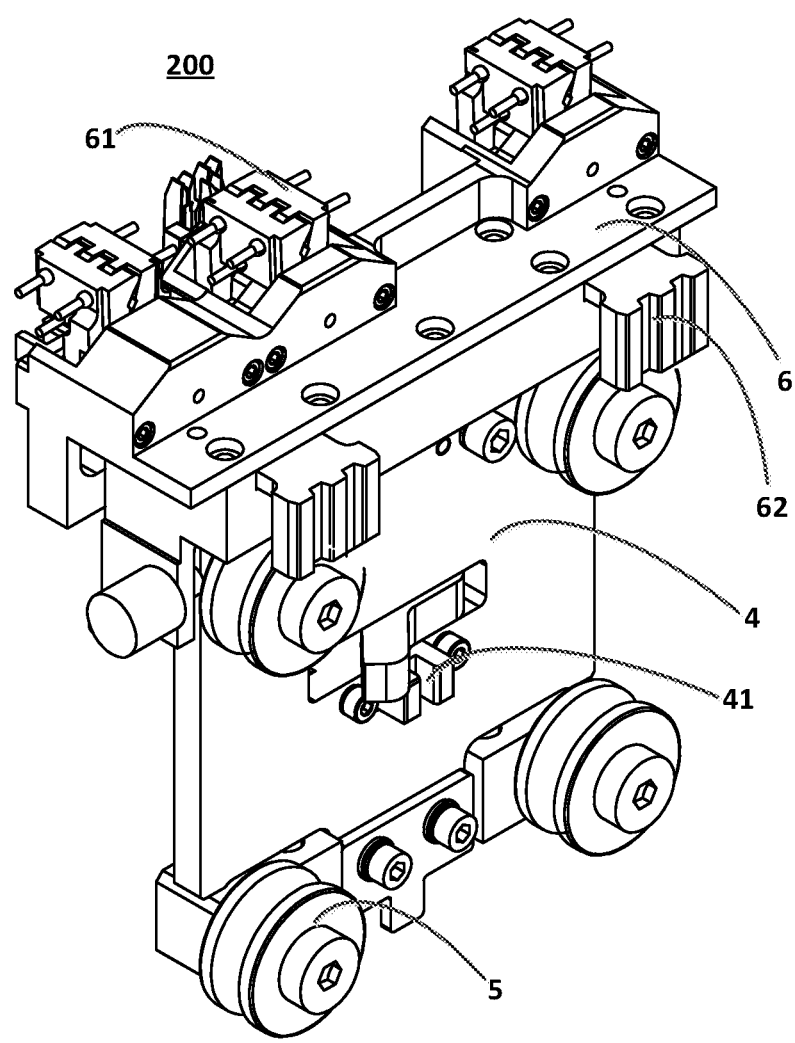
FIG. 6 is a perspective view of a main carrier according to an embodiment.

In an exemplary embodiment, as shown in FIG. 2, step portions 11 are provided on either upper and lower portions of the first base 1, respectively. Accordingly, as shown in FIG. 12, corresponding guide grooves 712 cooperated with the step portions 11 are provided at an inside of a lengthwise beam 711 of the first frame 71, so that the step portions 11 of the first base 1 may be restricted or held in the guide grooves 712. In this way, the first base 1 will not be detached from the first frame 71 while moving along the first frame 71.

In an exemplary embodiment, as shown in FIGS. 7, 8, 12, and 13, the movable mechanism 5 of the main carrier 200 comprises a plurality of rollers 51 arranged vertically on the second base 4 in at least two rows. Correspondingly, the second frame 72 is provided with a plurality of rows of guide rails 721 with which the plurality of rows of rollers 51 of the movable mechanism 5 of the main carrier 200 are coupled, respectively. Further, a groove is formed in a rim 511 of each of the rollers 51. The guide rail 721 is partially received within the groove 511, which may prevent the roller 51 from being disengaged from the guide rail 721, thereby holding the main carrier 200 on the second frame 72.

In an exemplary embodiment, as shown in FIG. 13, the carrying apparatus 500 further comprises a conveyor belt 722 disposed on the second frame 72. The conveyor belt 722 is provided with a plurality of racks. Correspondingly, the second supporting base 6 is provided with at least one driven rack mechanism 62, shown in FIGS. 8-10, engaged with the racks of the conveyor belt 722 so that the main carrier 200 is driven to move by the conveyor belt 722. In this way, the carrier assembly 300 may move on the first frame 71 and the second frame 72 when driven by the conveyor belt 722.

Figure 8:
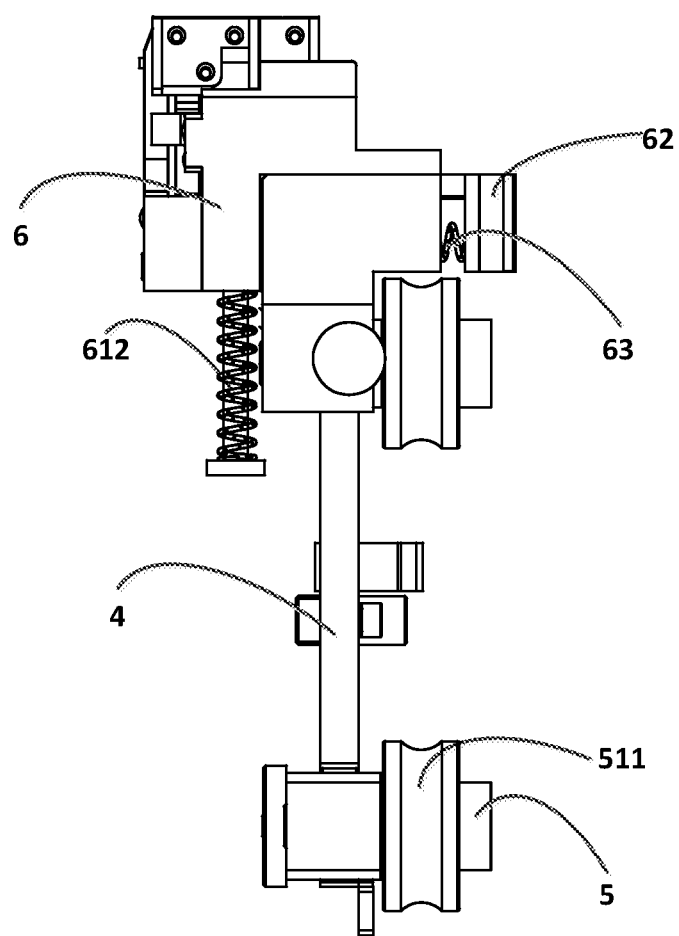
FIG. 8 is a side view of the main carrier.
Figure 9:
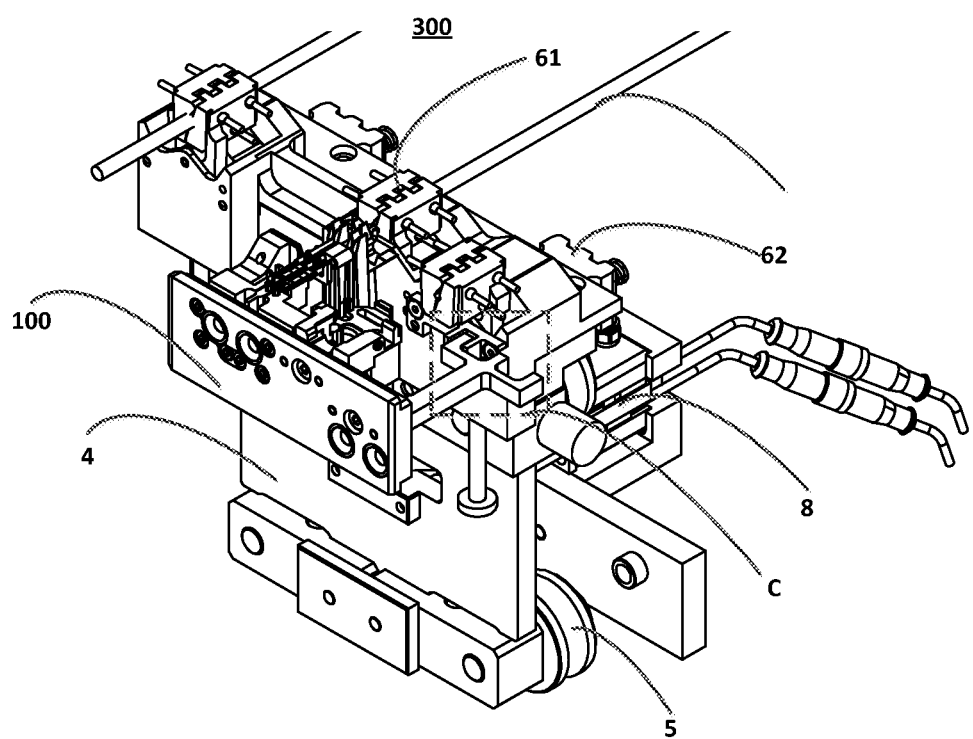
FIG. 9 is a perspective view of a carrier assembly formed by assembling the auxiliary carrier and the main carrier.
Figure 10:
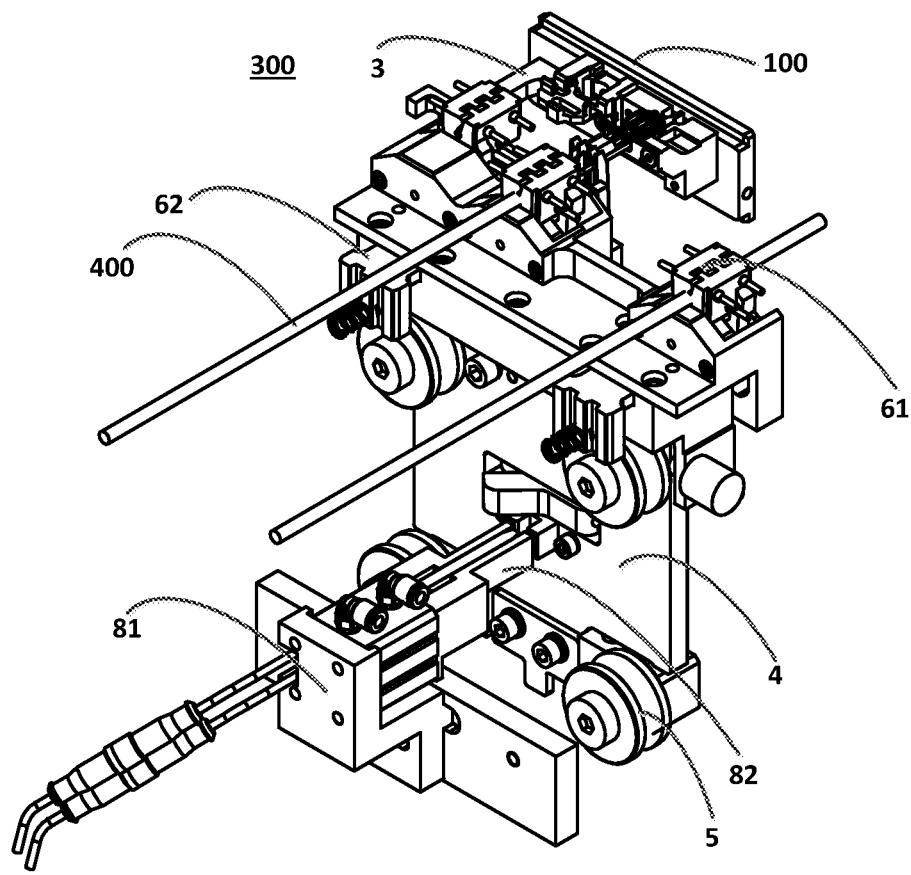
FIG. 10 is another perspective view of the carrier assembly.

In an exemplary embodiment, as shown in FIGS. 8, 12 and 13, the second supporting base 6 is provided with an elastic mechanism 63 configured to elastically urge the driven rack mechanism 62 toward the conveyor belt 722 to maintain a stable engagement of the driven rack mechanism 62 with the racks of the conveyor belt 722.

Figure 7:
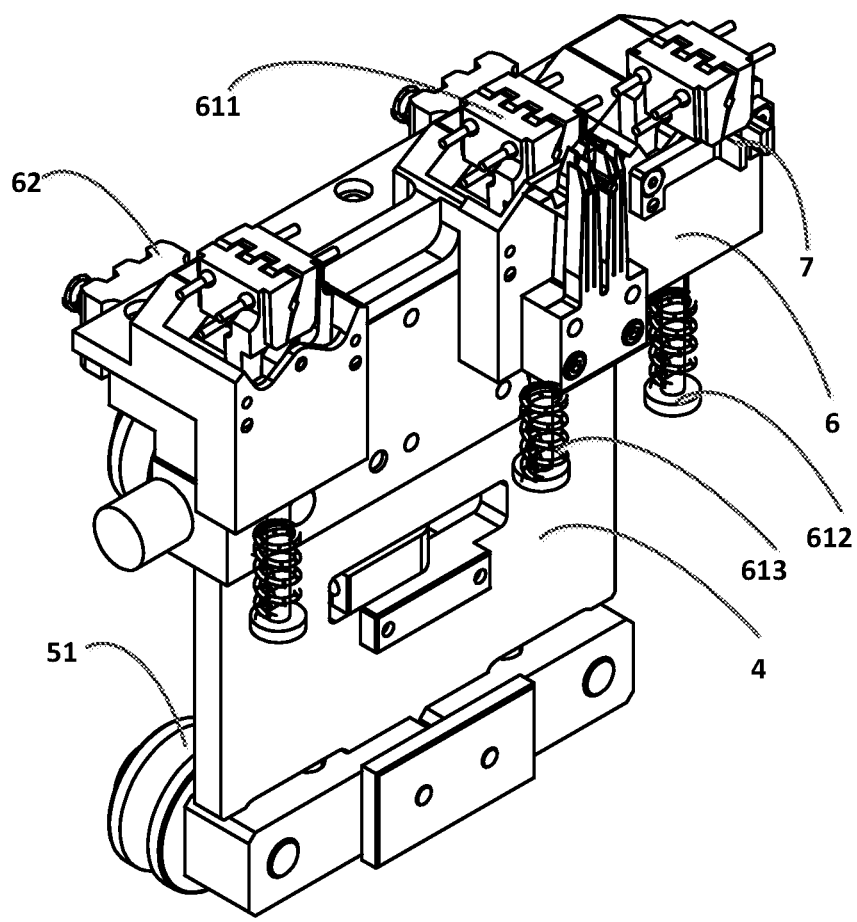
FIG. 7 is another perspective view of the main carrier.

In an exemplary embodiment, as shown in FIG. 7, the holding mechanism 61 of the main carrier 200 comprises two half bodies 611 configured to move towards or away from each other to clamp or release the cable 400. In an exemplary embodiment, the holding mechanism 61 further comprises a driving mechanism 612 adapted to drive the two half bodies 611 away from each other, thereby allowing the cable 400 to be released.

In an exemplary embodiment, as shown in FIG. 7, the holding mechanism 61 further comprises an elastic holding mechanism 613. The driving mechanism 612 drives the two half bodies 611 away from each other against an elastic force of the elastic holding mechanism 613, so that the two half bodies 611 may move toward each other by the elastic force of the elastic holding structure 613 when a force applied to the driving mechanism 612 disappears, thereby holding the cable 400 in the holding mechanism 61.

In an exemplary embodiment, as shown in FIGS. 12 and 13, the carrying apparatus 500 further comprises a first positioning mechanism 9 mounted on the first frame 71 and configured to position the auxiliary carrier 100 so that the auxiliary carrier 100 does not continue to move when moving to a predetermined position. For example, the first positioning mechanism 9 comprises a first driving mechanism and a first positioning rod extendable from the first driving mechanism. Accordingly, the first base 1 is provided with a first positioning groove 12, shown in FIG. 4, into which the first positioning rod is inserted when driven by the first driving mechanism, thereby preventing the auxiliary carrier 100 from being moved relative to the first frame 71. For example, the first driving mechanism may comprise a retractable device such as a pneumatic cylinder, a hydraulic cylinder, an electromagnetic attraction mechanism and the like. In an alternative embodiment, the first positioning mechanism may comprise an electromagnetic attraction device preventing the auxiliary carrier 100 from moving by electromagnetic attraction with the first base.

In an exemplary embodiment, as shown in FIGS. 9, 10, 12, and 13, the carrying apparatus 500 further comprises a second positioning mechanism 8 mounted on the second frame 72 and configured to position the main carrier 200. The second positioning mechanism 8 comprises a second driving mechanism 81 and a second positioning rod 82 extendable from the second driving mechanism 81. Accordingly, the second base 4 is provided with a second positioning groove 41, shown in FIG. 6, into which the second positioning rod 82 is inserted when driven by the second driving mechanism 81, thereby preventing the main carrier 200 from being moved relative to the second frame 72. For example, the second driving mechanism 81 may comprise a retractable device such as a pneumatic cylinder, a hydraulic cylinder, an electromagnetic attraction mechanism and the like.

According to the auxiliary carrier 100, the carrier assembly 300, and the carrier apparatus 500 described in any one of the above embodiments, during manufacturing of the electrical connector with the cable 400, firstly, the main carrier 200 is mounted on the second frame 72, the auxiliary carrier 100 matched with the connection terminal and the housing is mounted on the first frame 71, and the second coupling portion 7 of the main carrier 200 is coupled with the first coupling portion 3 of the auxiliary carrier 100. Then, the prepared cable 400 is placed on the holding mechanism 61 of the main carrier 200, and the wire 402 extending from the cable 400, the connection terminal 401 and the housing to be mounted on the connection terminal are placed in the wire receiving groove 23 of the auxiliary carrier 100, the terminal receiving groove 21 and the housing receiving groove 22, respectively, in advance. Then, the cable, the connection terminal and the housing are transported to predetermined station by moving the carrier assembly 300 comprising the main carrier 200 and the auxiliary carrier 100. Thereafter, the cables, the connection terminal and the housing are picked up, respectively, and assembled into the electrical connector on an installation station by the robot. If the connection terminal and the housing of the electrical connector to be manufactured are changed in shape and size, it is not necessary to remove the main carrier 200 when replacing a new auxiliary carrier 100, and another new electrical connector may be assembled by repeating the above operational process.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle. Although the disclosure have been described hereinbefore in detail with reference to the attached drawings, it should be appreciated that the disclosed embodiments in the attached drawings are intended to illustrate embodiments of the disclosure by way of example, and should not be construed as limitation to the disclosure. Although a few embodiments of the general inventive concept of the disclosure have been shown and described, it would be appreciated by those skilled in the art that changes or modification may be made to these embodiments without departing from the principles and spirit of the general inventive concept, the scope of which is defined in claims and their equivalents.

What is claimed is:

1. An auxiliary carrier, comprising:
   a first base;
   a first supporting base mounted on the first base and having a plurality of receiving grooves receiving a plurality of components of an electrical connector; and
   a first coupling portion mounted on the first base or the first supporting base, the first coupling portion adapted to be coupled with a second coupling portion of a main carrier so that the auxiliary carrier is movable along with the main carrier.

2. The auxiliary carrier of claim 1, wherein the receiving grooves include a terminal receiving groove adapted to receive a connection terminal of the electrical connector.

3. The auxiliary carrier of claim 2, wherein the receiving grooves include a housing receiving groove adapted to receive a housing of the electrical connector.

4. The auxiliary carrier of claim 3, wherein the receiving grooves include a plurality of wire receiving grooves adapted to receive a plurality of wires of a cable.

5. The auxiliary carrier of claim 1, wherein the first coupling portion has a cantilever mounted on the first base and a fork portion provided on the cantilever.

6. The auxiliary carrier of claim 1, wherein the first supporting base is detachably mounted on the first base.

7. The auxiliary carrier of claim 1, wherein a plurality of step portions are provided on an upper portion and a lower portion of the first base.

8. A carrier assembly, comprising:
   an auxiliary carrier including a first base, a first supporting base mounted on the first base and having a plurality of receiving grooves receiving a plurality of components of an electrical connector, and a first coupling portion mounted on the first base or the first supporting base; and
   a main carrier assembled with the auxiliary carrier so that the auxiliary carrier is movable along with the main carrier.

9. The carrier assembly of claim 8, wherein the main carrier includes a second base, a movable mechanism mounted on the second base to drive the carrier assembly to be moved, a second supporting base mounted on the second base and provided with a holding mechanism for holding a cable, and a second coupling portion provided on a side of the second supporting base opposite to the movable mechanism and adapted to be coupled with the first coupling portion of the auxiliary carrier.

10. The carrier assembly of claim 9, wherein the movable mechanism includes a plurality of rollers arranged vertically on the second base in at least two rows.

11. The carrier assembly of claim 9, wherein the second supporting base has at least one driven rack mechanism engaged with a rack of a conveyor belt, the main carrier is driven to move by the conveyor belt.

12. The carrier assembly of claim 11, wherein the second supporting base has an elastic mechanism configured to elastically urge the driven rack mechanism toward the rack of the conveyor belt to maintain an engagement of the driven rack mechanism with the rack of the conveyor belt.

13. The carrier assembly of claim 9, wherein the holding mechanism includes a pair of half bodies configured to move towards or away from each other to clamp or release the cable.

14. The carrier assembly of claim 13, wherein the holding mechanism includes a driving mechanism adapted to drive the pair of half bodies away from each other.

15. The carrier assembly of claim 14, wherein the holding mechanism includes an elastic holding mechanism, the driving mechanism drives the pair of half bodies away from each other against an elastic force of the elastic holding mechanism so that the pair of half bodies move toward each other by the elastic force of the elastic holding structure.

16. A carrying apparatus, comprising:
   a carrier assembly including an auxiliary carrier and a main carrier assembled with the auxiliary carrier, the auxiliary carrier includes a first base, a first supporting base mounted on the first base and having a plurality of receiving grooves receiving a plurality of components of an electrical connector, and a first coupling portion mounted on the first base or the first supporting base, the main carrier has a movable mechanism driving the carrier assembly to move, the auxiliary carrier is movable along with the main carrier;

a first frame on which the first base is movably mounted; and a second frame facing the first frame, the movable mechanism is mounted on the second frame.

17. The carrying apparatus of claim 16, wherein the second frame has a plurality of rows of guide rails on which a plurality of rows of rollers of the movable mechanism are mounted.

18. The carrying apparatus of claim 16, further comprising a first positioning mechanism mounted on the first frame and configured to position the auxiliary carrier.

19. The carrying apparatus of claim 16, further comprising a second positioning mechanism mounted on the second frame and configured to position the main carrier.

20. The carrying apparatus of claim 16, further comprising a conveyor belt disposed on the second frame and having a plurality of racks engaged with a driven rack mechanism of the main carrier to drive the main carrier to move.

* * * * *